United States Patent

[11] 3,588,142

[72] Inventor John F. Gorman
       May Cottage, Old Lane, Cobham, England
[21] Appl. No 758,331
[22] Filed Sept. 9, 1968
[45] Patented June 28, 1971

[54] VEHICLE SAFETY DEVICE
     42 Claims, 8 Drawing Figs.
[52] U.S. Cl...................................... 280/150,
                                                  293/1
[51] Int. Cl...................................... B60r 21/06
[50] Field of Search........................... 280/150;
                          162/9; 293/1; 23/121; 261/78; 9/1

[56]        References Cited
           UNITED STATES PATENTS
2,806,737   9/1957   Maxwell.................. 280/150
2,834,606   5/1958   Bertrand................. 280/150
3,243,822   3/1966   Lipkin................... (280/150UX)
3,309,109   3/1967   Baughman................. 280/150
3,370,886   2/1968   Frost.................... (280/150UX)

3,414,292   12/1968  Oldberg et al............ 280/150
3,465,827   9/1969   Lexy et al............... 162/9
              FOREIGN PATENTS
609,624     9/1960   Italy.................... 280/250
953,312     3/1964   Great Britain............ 280/150

Primary Examiner—Kenneth H. Betts
Attorney—Baldwin, Wight and Brown

ABSTRACT: The invention provides a safety device whereby a shield of resilient material is rapidly formed to protect an occupant of a vehicle in the event of rapid deceleration or imminent collision. Formation of the shield may be automatic, being controlled by suitable instruments of the vehicle, but may alternatively or in addition be manually actuated. The shield is an expandable element which is rapidly expanded to its operative position by a prepressurized filler material when actuated, being normally held in a retracted position by release means. The shield may be positioned wholly or partly to surround portions of the body of an occupant of the vehicle, or may be provided exteriorly of the vehicle to cushion impact on collision.

PATENTED JUN 28 1971

VEHICLE SAFETY DEVICE

This invention relates to safety devices which can, for example, be used to provide protection for the occupants and structure of land, sea or air vehicles, and includes means for providing a rapidly produced shield or cocoon when a collision crash is imminent, which acts to cushion the effects of impact on the vehicle when an accident occurs and preferably to protect and constrain the occupants.

Thus, the shield or cocoon may be arranged to be produced outside the vehicle to prevent damage to the structure or inside the vehicle to protect the occupants. Again, the shield may be carried by the occupants of a vehicle themselves so that it is provided on the wearer as opposed to being provided on the structure of the vehicle.

An object of the invention is to provide a vehicle safety device comprising an expandable element which can be positioned internally or externally of the vehicle and which can be expanded from an inoperative retracted position to an operative expanded position by means of filling the element with a rapidly expandable filler material.

Another object of the invention is to provide means for filling the element with a rapidly expandable filler material which is prepressurized, and release means which retains the expandable element in its inoperative retracted position and tends to prevent the expandable element from expanding.

In a preferred construction according to the invention, the expandable element is held in a housing which is closed by a cover which is released to allow the element to expand to its operative position.

With this arrangement the cover may be retained in position by a latch which is released by a gas or fluid operated device and in one preferred construction a gas or fluid operated device is deflated to release the latch whereas in another it is inflated to release the latch. The latch may be annular and may surround the periphery of the cover.

Preferably the gas or fluid operated device is electrically operated and in one convenient construction the electrical operation may be caused by the deformation of a piezoelectric crystal.

In any case, the gas or fluid operated device may also include an explosive cartridge by which it is actuated.

In one preferred construction a gas or low viscosity fluid is introduced into the fluid operated device under pressure by the action of a piston and a diaphragm actuated by the cartridge, and the gas or fluid operated device may thus conveniently be in the form of an expandable bladder.

Preferably the rapidly expandable filler material which is supplied to the expandable element is combined with an aerosol propellant material.

Thus, the filler material may be a fluid state foam and the following are examples of suitable aerosol propellant materials:

$CHClF_2$ (Monochlorodifluoromethane),
$CCl_2F_2$ (Dichlorodifluoromethane),
$CCl_3F$ (Trichloromofluoromethane),
$C_2Cl_2F_4$, $C_2Cl_3F_3$, Butane)Propane, compressed Nitrogen/Propane, Nitrous Oxide, Carbon Dioxide.

The active ingredient of the filler material may be one of a range of foam substances, which is compatible and miscible with the propellant. A solvent may be added to improve stability and compatibility between the constituents and to produce modified pressure characteristics.

Particular amounts of propellant will be added to the filler medium to limit the final pressure in the expandable element.

The expandable filler material is preferably stored in a pressurized state in a forcing chamber from which it is supplied directly to the expandable element and this forcing chamber may be provided with a nonreturn valve through which the filler material is loaded.

In a modified construction the forcing chamber is divided into two portions by a movable wall, the filler medium and aerosol propellant occupying the first portion to which the expandable element is connected and means being provided for prepressurizing the second portion.

This movable wall may be provided by a diaphragm and the second portion of the forcing chamber may be prepressurized before operation of the release means by an aerosol propellant or the like.

The amount of filler medium required in this second arrangement is less than that required in a forcing chamber without this feature, as all of the filler material is transferred into the expandable element whereas otherwise the forcing chamber remains full of the expanded filler material after operation of the apparatus. In addition, the rate of filler medium transferred from the forcing chamber into the expandable element remains constant throughout the operation, whereas where the transfer takes place from an undivided chamber, the pressure falls off with consequent reducing rate of transfer.

The material for prepressurizing the second portion of the forcing chamber is preferably supplied by a cartridge which is discharged into the second portion during a loading operation.

The filler material is preferably arranged to pass through a grid of tapering holes prior to entering the expandable element, the taper reducing in section towards the forcing chamber thus reducing initial surge on the expandable element on release and promoting consistency and expansion of the filler.

The grid may thus be provided between the forcing chamber and the housing in which the expandable element is held prior to operation, and the ends of the expandable element are gripped between the housing and the grid.

The expandable element is preferably carried on a mounting and means are included for releasing the expandable element from the mounting after a predetermined time interval after it has been expanded.

This action may be achieved by the operation of a catch which is actuated by a release cartridge and the release cartridge may be arranged to act on a piston to move an operating member.

The expandable element and forcing chamber assembly may conveniently be connected to the mounting by a frame which is moved by the operating member to release the expandable element and forcing chamber assembly and the frame may thus be provided with keyhole slots which engage headed retaining elements carried on fixed parts of the vehicle. Further, the frame having "keyhole" slots is releasable with the expandable element and forcing chamber assembly and remains with the assembly through the provision of headed buttons spaced around the inside periphery of the frame.

This method of release may conveniently be used with the means for operating the gas or fluid operated release device and thus the piston may be operated by a double acting cartridge, the first operation of which moves the piston in a first direction to operate the gas or fluid operated device to release the cover, and the second operation of which moves the piston in a second direction to act on the operating member to operate the release catch after a predetermined time delay. With this arrangement it will be appreciated that after initial operation of the expandable element, the element and forcing chamber assembly will be released thus freeing the vehicle or allowing free movement in the vehicle.

When the mechanism for releasing the expandable element and forcing chamber assembly is not used in conjunction with the initial operating means a single gas discharge cartridge with a time delay may be used which is initiated by an electric charge at the same time as the initial operating cartridge for the gas or fluid operated device.

The expandable element can take a variety of forms, strength and elasticities to suit the size, shape and type of protection required and the operating equipment will also vary to suit the shape, function and location of the protective element.

The present invention also provides for a let-down valve to allow the expandable element to be drained after use so that after release from the vehicle, the filler medium can be exhausted and the volume of the protective element reduced and exchange replacement safety devices could then be fitted in place of those used.

In a preferred construction the expandable element is made up from a number of narrow elements which are joined together, for example by stitching or thermal bonding or adhesive and each expandable element is preferably provided with a reinforced outer skin.

The safety apparatus may also be constructed so that it can be attached to the occupant of the vehicle and not the vehicle itself so that in addition to its use inside the vehicle it could also be used where the passenger had departed from it. This application of the safety equipment may be attached to the person in a number of different places, which would dictate the shape and construction of the apparatus.

Thus, the expandable element could be carried on a mounting for attachment to a person or animal and the mounting could be connected to a forcing chamber of annular or other suitable configuration in which the expandable filler material is provided.

With this arrangement the expandable filler element may be held in a housing having a cover which extends in a plane transverse to the axis of the forcing chamber and if required the housing could be provided on the outside of the forcing chamber where it would add to its radius when an annular type forcing chamber was used.

The housing may be arranged to extend 360° around the forcing chamber and the depth of the housing may be varied to suit the distance to which the expandable element is to extend in any particular sector.

With this arrangement the cover could be made up from two or more separate lengthwise sections which would separate when the device was activated.

Thus, the device could be fixed to an attachment in the form of a harness, strap, belt or item of clothing which could be worn by the person or animal using the device.

In any case, means could be included for operating the device by the person in charge of the vehicle or by any person wearing the device.

Alternatively, the means for operation could be included in the vehicle controls such as the vehicle brakes, speedometer, deceleration meter, air-speed indicator or rate of descent meter.

In another arrangement means could be included for operating the device by a radio or radar signal from outside the vehicle, thus enabling remote control to be applied.

The invention may be performed in various ways but two embodiments will now be described by way of example and with reference to the accompanying drawings, in which:

The apparatus shown in the drawings is for installation in a motor vehicle and is intended to provide protection in the form of a shield or cocoon which surrounds the passengers and driver from above head level and down to the waist. This protection is derived from the toughness, elasticity and shock absorbing characteristics of a shield which is in the form of an expandable element, and which, when in use, expands by filling with a fluid state foam medium, and which becomes fully effective in ½ sec. approximately after the device has been initiated.

Figure 2:
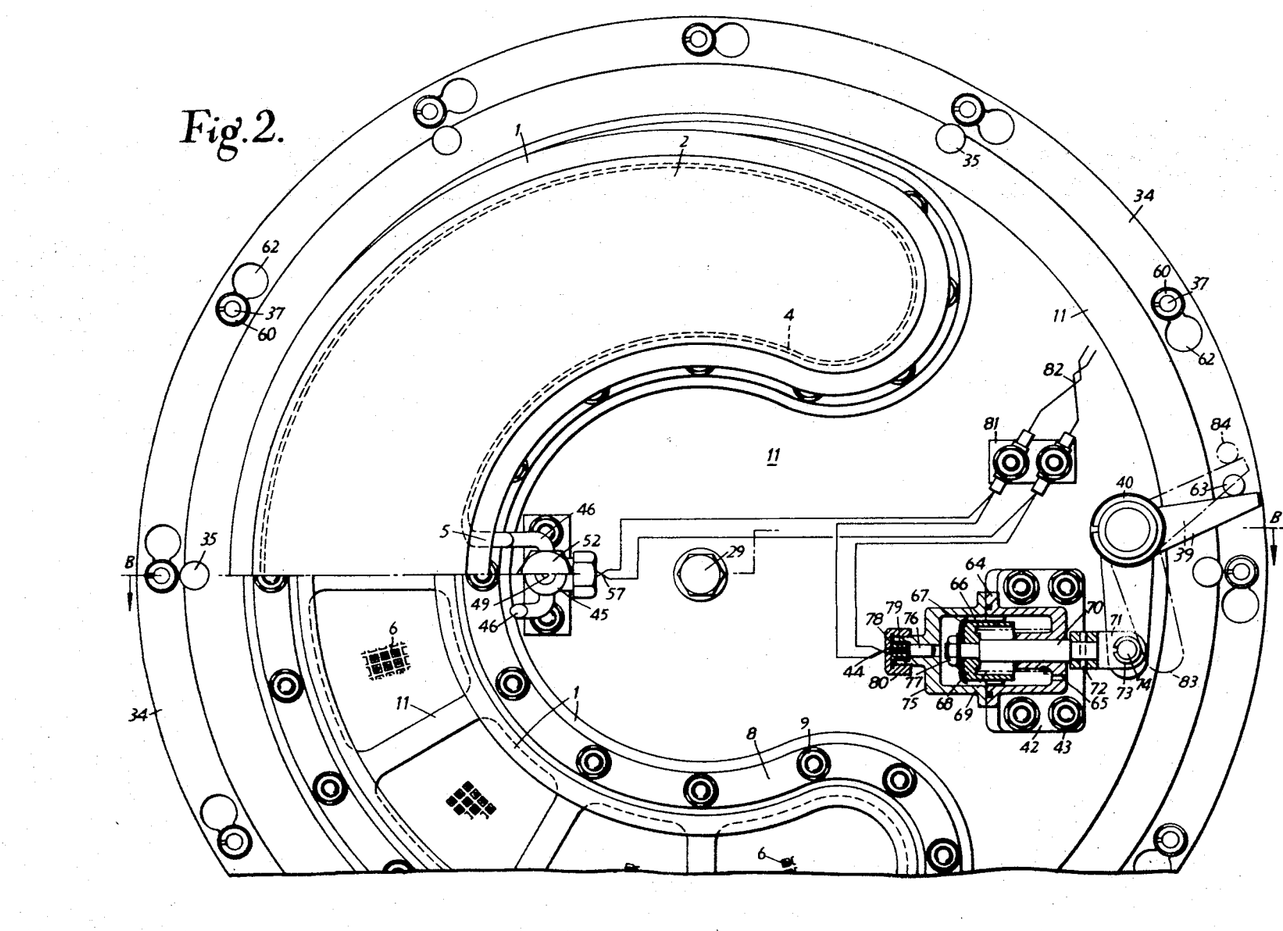
FIG. 2 is an inverted sectional plan view of the arrangement shown in FIG. 1 (Section AA of FIG. 1)

The expandable element, indicated by reference numeral 3, is arranged in a housing 1 in a collapsed and folded position, the housing being curved as shown in FIG. 2, and the expandable element 3 when activated extending and forming itself around the occupant of the vehicle immediately beneath it. It retains its general curved form on expansion, but the detail shape fills out to follow fairly accurately the head, front and side areas of the human form, with additional thicknesses corresponding to the position of the steering wheel.

Figure 1:
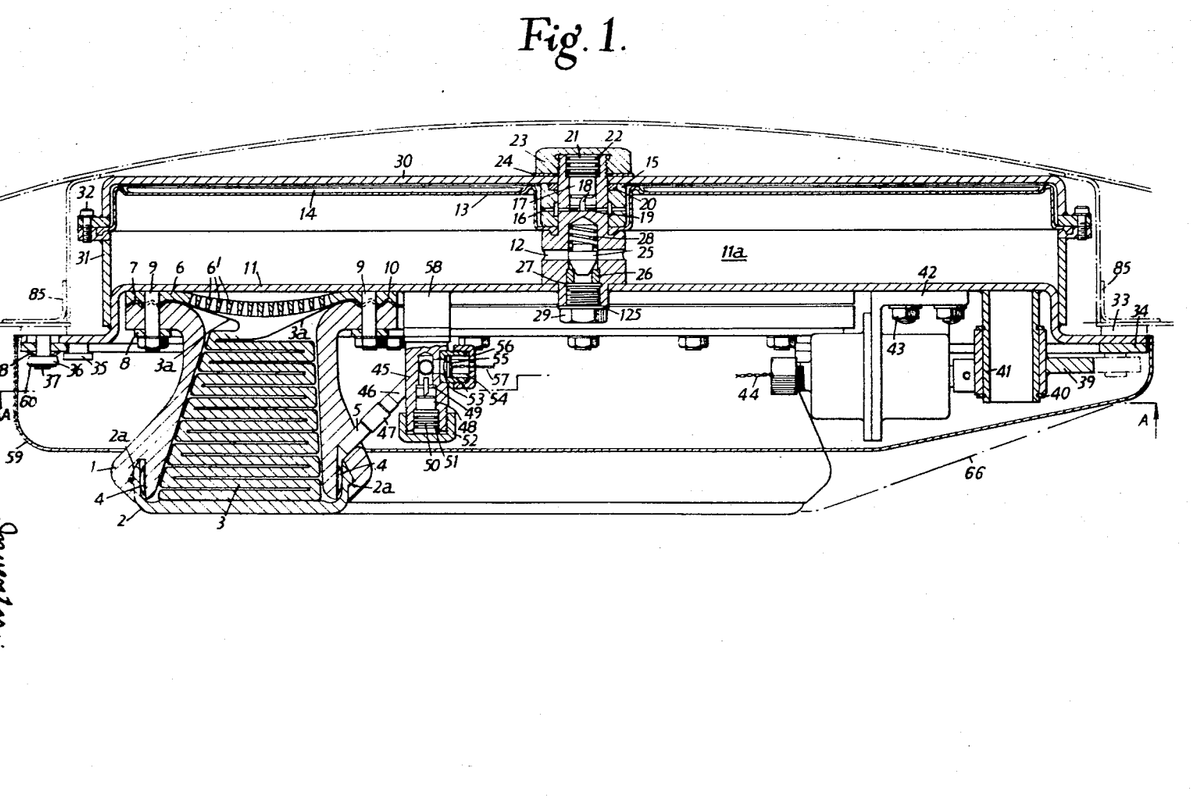
FIG. 1 is a cross-sectional side elevation (Section BB FIG. 2) of the operating mechanism according to the invention for installation in the roof of a motor vehicle.

The expandable element 3 is trapped in its housing 1 prior to use by a cover in the form of a retaining cap 2 which interlocks with the housing by interengaging edges 2a which together form a annular latch between the periphery of the housing and the periphery of the cover. This interlock is maintained against the pressure of the expandable element trying to eject to its expanded, operative position by a bladder 4, of highly impervious flexible material, which runs around the complete lower part of the housing 1 and is maintained in position by adhesive. The ending 5 of the bladder 4, connects into inflation/deflation apparatus, which comprises a body 45, from which two connectors 46 emanate to connect with the bladder ends, the connections being made complete and leakproof by shrunk-on ferrules 47. Inflation of the bladder takes place when a gas discharge cartridge 48 is penetrated by a hollow needle 49, which allows the gas to pass into the bladder and pressurize it sufficiently to hold the retaining cap firmly in position, the bladder thus providing a gas or fluid operated device.

To prevent leakage, a sealing piston 50 with triple sealing rings 51 is provided, which also drives the gas discharge cartridge on to the hollow needle when a cap 52 is screwed down. The bladder is deflated instantly when a destructible diaphragm 55 is destroyed when a small explosive charge incorporated into the diaphragm is detonated by an electrical charge conveyed by circuit wires 57. Loss or pressure past the edges of the destructible diaphragm is prevented by sealing washers 53 which are held in close contact with the diaphragm by a clamping ring 54, which in turn is held in position by a gas escape nut 56. The complete bladder inflation/deflation mechanism is mounted in position by structure 58 which is connected to a mounting plate 11 which also provides the lower wall of a forcing chamber 11a within which the expandable filler material is housed in a manner to be described.

When the bladder is deflated the triangular raised portions of the retaining cap 2 which provide the latch become free to move inwards and out of engagement with corresponding triangular forms in the expandable element housing 1 and the force exerted on the element 3 by the pressure of the filler medium forces the retaining cap 2 free from the housing 1 as soon as the disengagement takes place.

When the expandable element 3 has been ejected from its housing 1 the filler medium transfers from the forcing chamber 11a into the element by passing through a grid 6 having tapered openings 6' which suppresses initial surge and helps to promote expansion of the filler medium. This grid 6 takes the same plan form as the housing 1, and is sectionally dished. Mating corrugations 7 and 10 are formed in the grid 6 and housing 1, which when clamped together by nuts and clamping ring 8 on studs 9, trap the outer skin 3a of the expandable element 3 with its reinforcement. This enables the stresses set up in the expandable element to be taken out at this point and transferred to the mounting plate 11, which forms the lower wall of the forcing chamber. To prepare the operating equipment for use, the retaining cap 2 is first locked with housing 1 and the filler medium with an aerosol propellant is then introduced into the forcing chamber 11a through filler plug 29, past a nonreturn valve which comprises a taper plug 25, a seating 26, with its retaining circlip 27. The taper plug is maintained on its seat by compression spring 28, but during filling, the filler medium forces this off its seating to gain entry through passages 12, into the forcing chamber. After this operation, a cartridge 17, containing a fluorocarbon, or similar substance, is forced to be penetrated by a hollow needle, reference 18, which is mounted in a dispersal base 19, which conducts the gas to a gallery and entry ducts 16, so that a diaphragm 13, with its flattening disc 14, comes under pressure. This pressure transmits itself through the diaphragm to the filler medium below, which is already under pressure due to the aerosol propellant constituent. The diaphragm 13 is annular in construction, and is of the rolling type. Its outer periphery is held between a top cover 30 and sidewalls 31 of the forcing chamber and its center is clamped between a central clamping body 15 and a central through body in which the filler medium entry passages 12 are formed.

The filler material which is supplied to the lower part of the forcing chamber 11a beneath the dividing diaphragm 13, is in a fluid state and is combined with an aerosol propellant such as:

$CHClF_2$ (Monochlorodifluoromethane),
$CCl_2F_2$ (Dichlorodifluoromethane),
$CCl_3F$ (Trichloromonofluoromethane),
$C_2Cl_2F_4$, $C_2Cl_3F_3$, Butane/Propane, or compressed Nitrogen/Propane, Nitrous Oxide, or Carbon Dioxide.

A solvent can be added to improve stability and compatibility between the constituents and to produce modified pressure characteristics.

The top cover 30 is held to the sidewalls of the forcing chamber by attachment screws 32, and the central clamping body which is fitted with gas escape seal 20. Final clamping and penetration of the cartridge 17 is accomplished by tightening a cap nut 23, which drives the sealing piston 21, which is fitted with triple seals 22, behind the cartridge. Sealing washers 24 and 125 are situated under the cap nut 23 and filler plug 29, respectively.

The complete operating equipment is maintained in position within the vehicle structure 85, by a catch assembly comprising a system of retaining pins 37, attached to a mounting ring 33, which also forms part of the structure of the vehicle. The retaining pins pass through holes in the mounting plate 11 of the operating equipment and through a moving detachment ring 34, which is provided with keyhole slots 62. The retaining pins are fitted with retaining heads 36, which are maintained on the pins by circlips 60. Conical "Belville" type washers 38 are fitted between the retaining heads and the detachment ring 34. These force the mounting plate 11 into contact with the mounting ring 33 to prevent random movement of the operating equipment.

To allow release of the operating equipment, the detachment ring 34 moves rotationally under the influence of a release arm 39. This brings the large diameter portion of the keyhole slot 60, opposite the retaining pin and its head, which allows the mounting plate 11 to force itself from the vehicle. In order to stop the detachment ring moving other than rotationally, location studs 35 are positioned around the inside diameter of the detachment ring.

The release arm is actuated by a piston assembly from a normal position to a release position 83. The release arm, which moves a release pin 63 to position 84, is mounted on a pivot 41 and retained by circlips 40. A fork end 71 connects the piston rod 70 through pin 74 and retaining circlips 73 to the release arm, and the fork end is secured to the piston rod by a "roll" pin 72.

The release action is performed by the discharge of an electrically detonated time delayed cartridge 76 which forces a piston 68, mounted within a rolling diaphragm 66, with retaining plate 67 and clamping nut 77, to move backwards against the action of a compression spring 69 which latter keeps the release arm from moving unintendedly out of position prior to use.

An air release hole 65, prevents pressure buildup in cylinder 64, which is situated on a base 42, for purposes of attachment through studs 43 to mounting plate 11. The gas discharge cartridge is backed by a sealing piston 78 which is fitted with seal 79 and held in position by a cap nut 80, the nut having a central hole communicating with a bore in the sealing piston to allow the wires 44 of the detonating circuit to pass into the time delay cartridge 76. The detonating circuit wires pass to a terminal block 81 and are made common with the detonation wires 57 of the destructible diaphragm in the bladder inflation/deflation equipment. The wires 82 then pass away to the electrical power source controlling the action of the safety apparatus. The operating equipment is protected by a closure 59 provided with padding.

Figure 3:
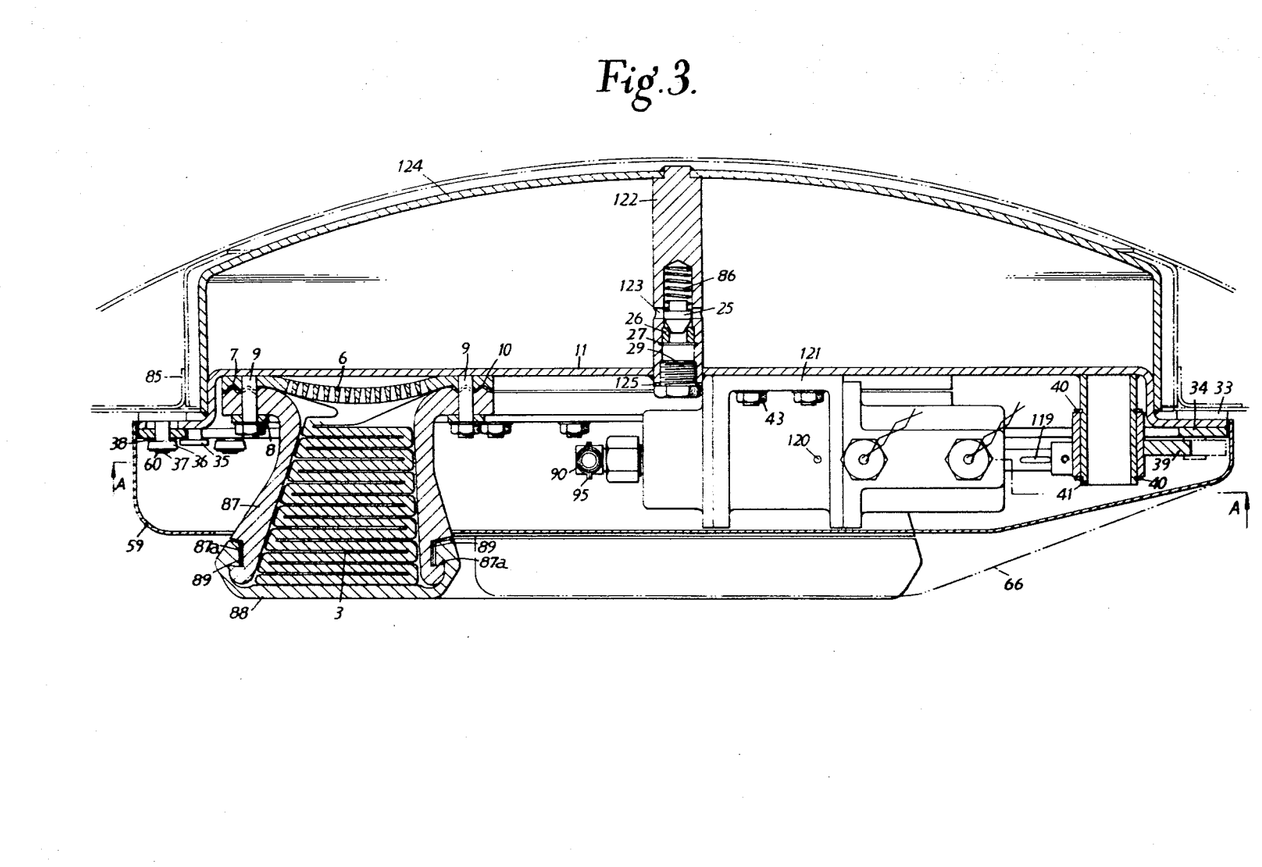
FIG. 3 is a cross-sectional side elevation (Section DD of FIG. 4) of an alternative embodiment of the operating mechanism according to the invention for installation in the roof of a motor vehicle.
Figure 4:
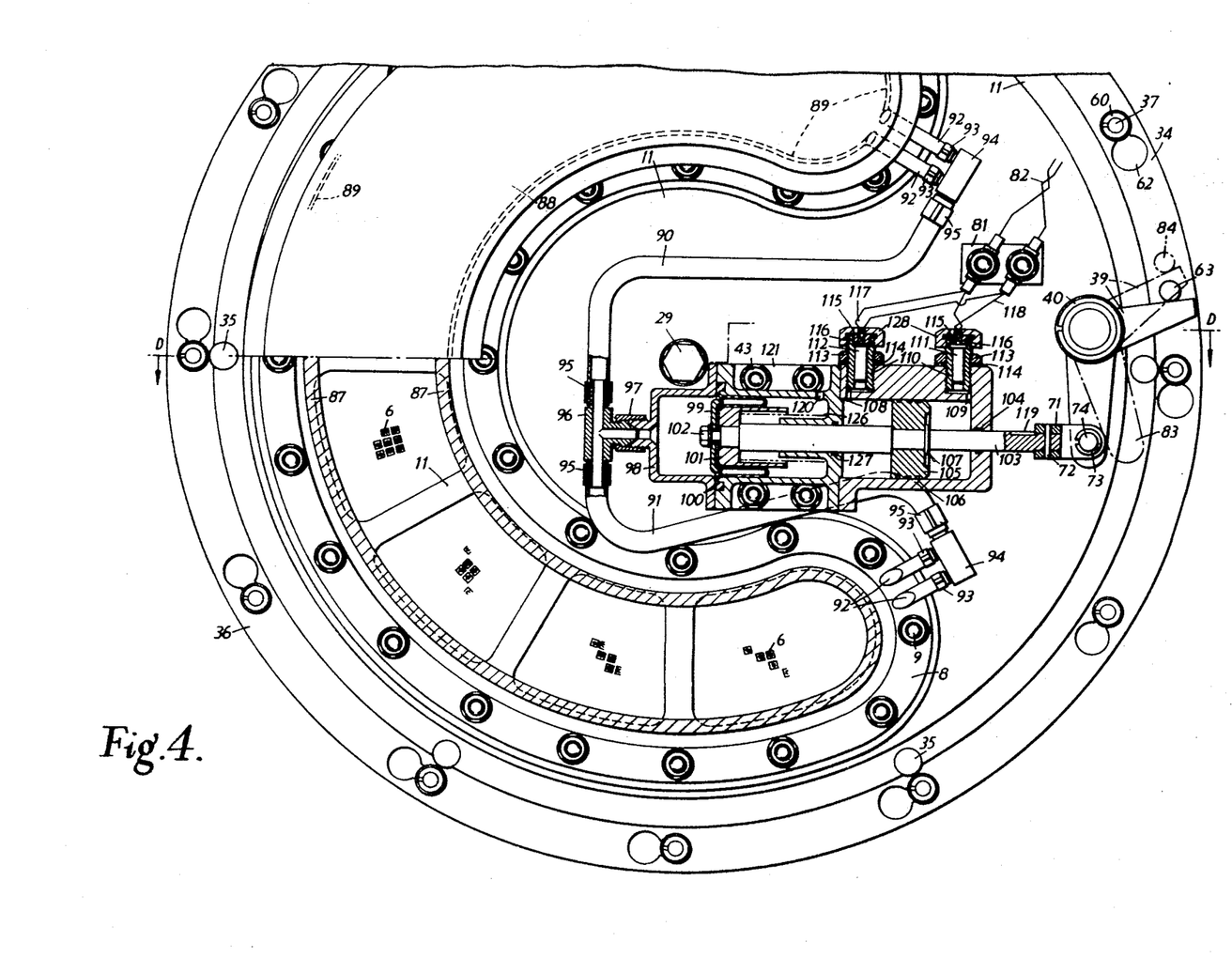
FIG. 4 is an inverted sectional plan view of the arrangement shown in FIG. 3 (Section CC of FIG. 3)

The second embodiment employs many common features with the first, although the principle of operation is different and the same reference numerals will be used to indicate similar parts.

In this construction the expandable element 3 is maintained in a housing 87 in a similar way to the first embodiment. It is released, however, by the inflation of a bladder 89 with a low viscosity fluid. This forces the interlocking latches 87a of the housing 87 and of the retaining cap 88 out of engagement, thereby releasing the expandable element 3 in the same way as described in connection with FIGS. 1 and 2. The fluid used for inflating the bladder is contained in a fluid system that includes transfer tubes 90 and 91, release bladder ends 92, of which there are four (the bladder being made up of two separate parts), manifold 94, T-fitting 96, and clamping ferrules 93 and 95.

A union nut 97 connects the T-fitting 96 to the reservoir 98. Fluid is transferred to the bladder when piston 101 moves forward with rolling diaphragm 100 which is retained against the piston by a plate 99 and nut 102. Compression spring 126 prevents random movement of the piston and rod assembly. An air entry and escape hole 120 is provided in double cylinder and base 121 which is attached to mounting plate 11 by studs 43. The forward action of the piston and rolling diaphragm which causes inflation of the bladder is initiated by the firing of a gas discharge cartridge 111. The consequent pressure buildup in the rear part of cylinder 121 via port 109 forces piston 105 to move from its central position to a more forward position, this motion being transmitted by piston rod 103. Grooves in the piston reduce gas leakage and the piston is maintained in position by circlip 107. Seal 104 prevents leakage outside the cylinder when not required. When the piston has moved to its forward position, a gas leakage path 119 is connected to the interior of the cylinder so that pressure in the cylinder is relieved. This enables the piston 105 to travel back on its return stroke without the resistance of the pressure that would otherwise exist.

Release of the operating equipment takes place after a time delay gas discharge cartridge 112 has been detonated. This, in common with expandable element release cartridge 111, is contained in a body 110 and backed up by a sealing piston 115 with seals 116 held in position by a cap nut 128, with a central hole communicating with a bore in the sealing piston to allow passage of detonating circuit wires 117 and 118. Locking nuts 113, together with washers 114, maintain the bodies 110 in position in the double cylinder 121.

Discharge of cartridge 112 through port 108 causes the piston 105 to move to the opposite end of the cylinder and in so doing causes the release of the operating equipment to take place in the same way as in the embodiment of FIGS. 1 and 2.

The forcing chamber of the operating equipment is filled in the same fashion as before through filler plug 29 and past a nonreturn valve, and through entry passages 123 formed in central column 122, fixed between mounting plate 11, and domed cover 124.

The underside of the operating equipment is covered by a closure 59 to which padding 66 is attached.

The amount of filler medium required in this arrangement is less than that required in a forcing chamber without this feature, as all of the filler medium is transferred into the expandable element, whereas otherwise the forcing chamber remains full of the expanded filler medium after operation of the apparatus. In addition, the rate of filler medium transferred from the forcing chamber into the expandable element remains constant throughout the operation, whereas where the transfer takes place from an undivided chamber, the pressure falls off with consequent reducing rate of transfer.

The forms of operating equipment herein described may have further alternative forms, by interchanging some of the features of one with the other. Possible arrangements of the alternative operating equipment features would allow a forcing chamber fitted with a diaphragm to be used in conjunction with the bladder inflation method of expandable element release, and a plain forcing chamber without diaphragm may be used in conjunction with the bladder deflation method of expandable element release, each system using the appropriate operating equipment release.

The arrangements described above are both for use in a motor vehicle and the electrical impulse to operate the firing cartridges could be supplied by a number of different arrangements. Thus, the device could be operated from the vehicle brakes, speedometer, deceleration meter or, if the apparatus were installed in an aircraft, rate of descent meter. Again, the impulse could be generated from a radio or radar signal and appropriate apparatus for conveying the required signals could be of any well-known kind.

If desired, a master switch could be provided adjacent the position of a passenger in the vehicle so that he could operate the device himself or it could be operated directly by the driver. With these latter arrangements it is merely necessary to provide an electric circuit and an operating switch.

In another arrangement a piezoelectric crystal could be arranged to be pressurized to cause the electrical impulse and this pressurization could again come from the vehicle controls or from a suitable lever operated by the driver or passenger.

If the apparatus is to be applied to a person, the forcing chamber could be arranged to be, for example, annular and the expandable element to extend to 360° around it. The forcing chamber will be connected to a mounting which could be carried by the person and thus be connected to a harness, strap, belt or item of clothing. With this arrangement the cover would be made in two or more separate lengthwise sections which would come apart when the device was operated and the depth of the housing could be varied to suit the distance to which the expandable element was desired to extend in any particular sector. With this arrangement the cover would, of course, extend in a plane transverse to the axis of the annular forcing chamber so that the desired protection extending over the person would be obtained.

Figures 5, 6:
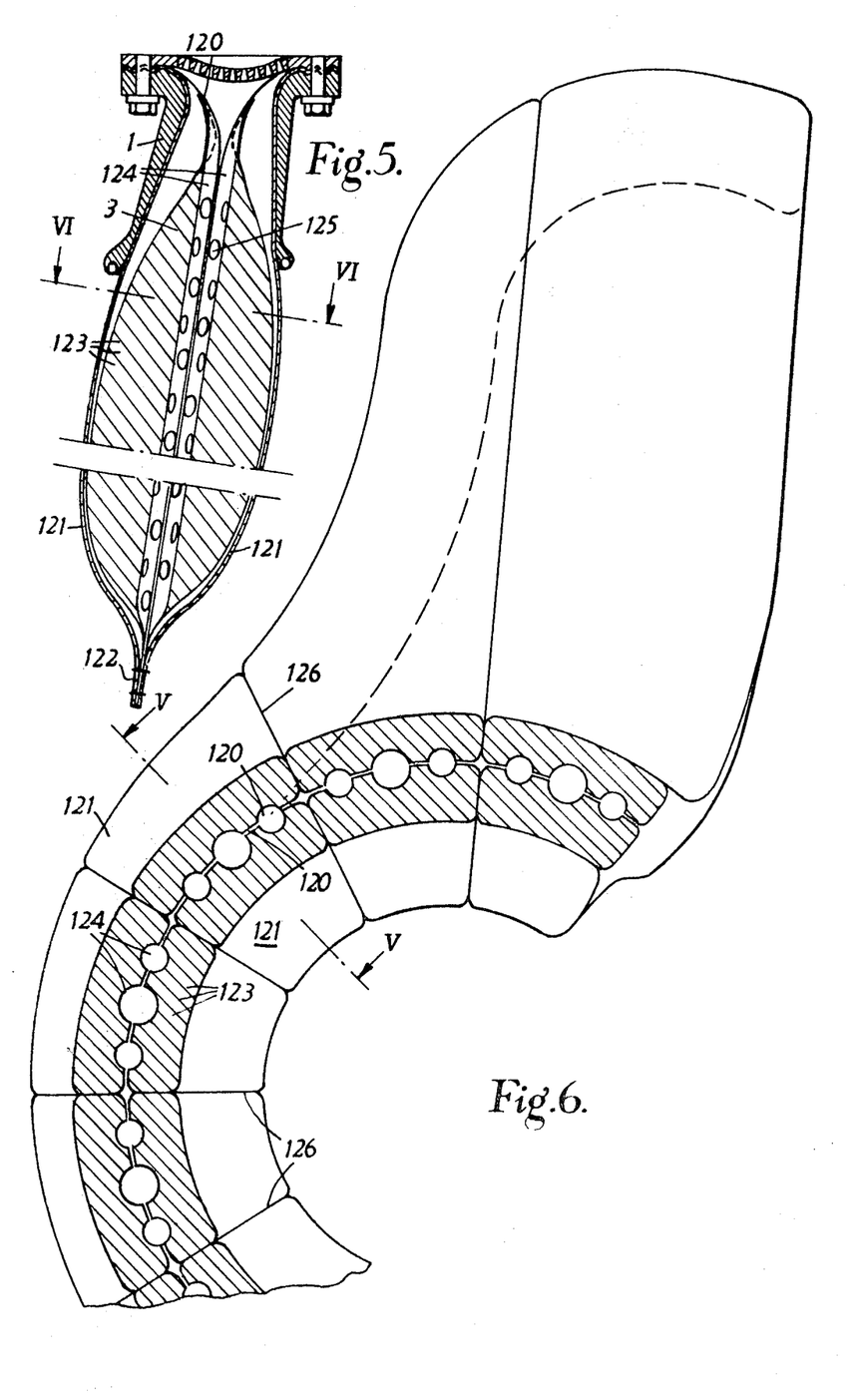
FIG. 5 is a side sectional elevation taken on the line V-V of FIG. 6 through a housing, showing the expandable element in its operative, filled state.
FIG. 6 is a sectional plan view of the filled element taken on the line VI-VI of FIG. 5, FIG. 7 schematically illustrates possible positioning of safety devices in accordance with the invention on an automobile.

FIGS. 5 and 6 illustrate the expandable element 3 when in its operative or filled condition. As will be seen the element 3 is divided along its length by internal walls 120 which are joined, together with the outer walls 121, which provide an outer skin and are made from a mesh of metallic or plastic materials covered with layers of plastic material film, as by stitching at the lower end 122 of the element. This hollow construction of the element 3 facilitates its rapid filling by the pressurized filler material, the inner walls 120 being additionally of a highly porous nature so that the filler material rapidly spreads from between the walls 120 into the individual, open cells 123 between the inner walls 120 and the outer walls 121 and forming the body of the expanded element 3. As shown in FIG. 5, this body tapers toward the housing 1, the resultant hollow spaces in the region of the housing 1 contributing to the rapid inflation of the element.

Further, the inflated body comprises a plurality of angularly spaced tubes 124 extending along the length of the filled element. These tubes 124 not only reinforce the filled element but by the provision of apertures 125 along the length of each tube rapid dispersal of the filler throughout the body of the element 3 is ensured.

As may be seen from FIG. 6, the body of the element is divided longitudinally by angularly spaced walls 126 extending between each inner wall 120 and the opposed outer wall 121. These walls 126 serve to minimize the damage to the effective functioning of the device which would be caused by local tearing or rupturing of one of the walls 121, by confining the rapid loss of filler material to the particular sector of the element between adjacent walls 126 where the damaged wall portion is located.

Figure 7:
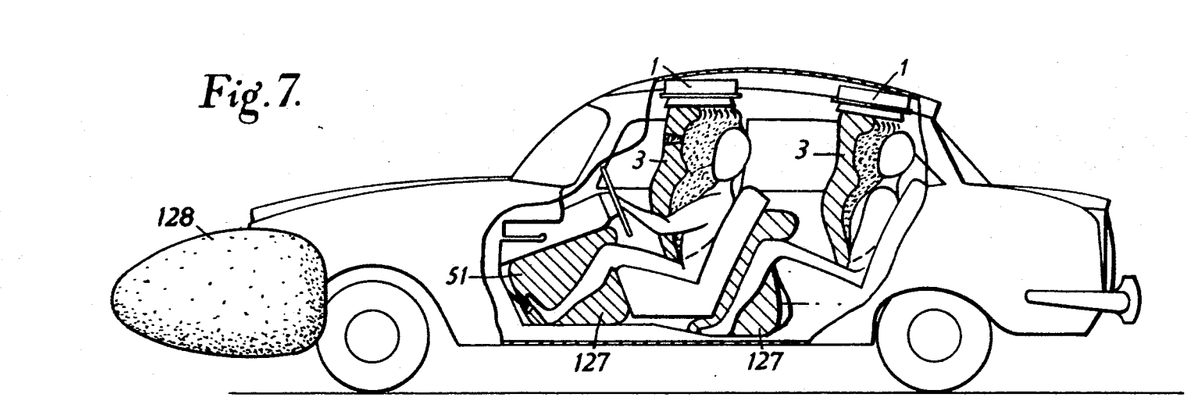
Figure 8:
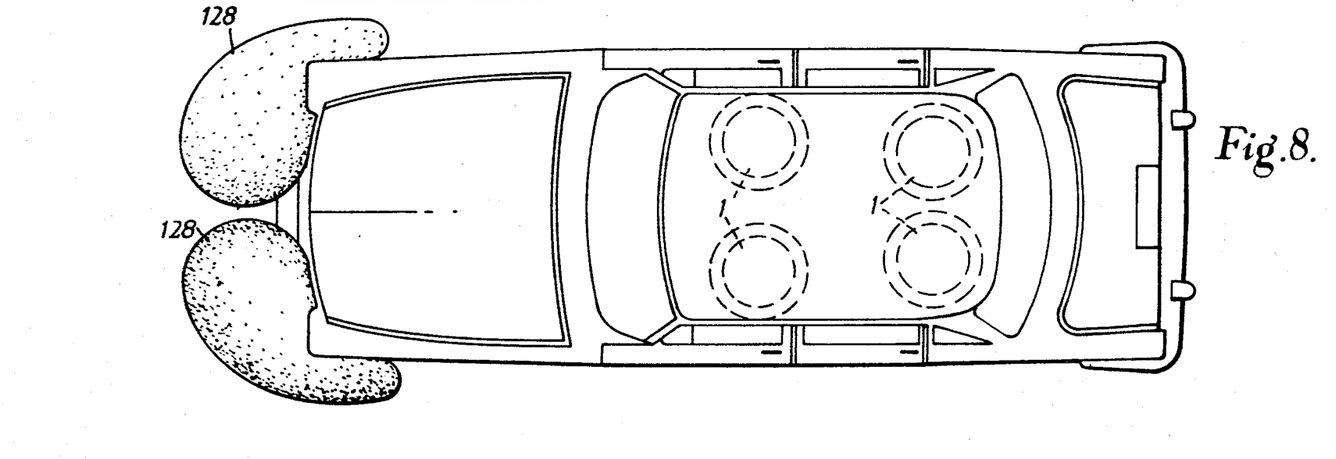
FIG. 8 is a plan view of the automobile of FIG. 7.

As previously noted, although in the preferred embodiments of the invention particularly described the device provides an element located in the roof of a vehicle which is extendable downwardly to protect the head, shoulder and chest regions of the body it is possible to provide safety device utilizing the same essential components to protect other parts of the body. FIGS. 7 and 8 illustrate an automobile provided with four "overhead" devices according to FIGS. 1 and 2 or 3 and 4, the elements 3 being extendable out of the respective housings 1 over the driver and three other occupants of the vehicle.

In addition to the "overhead" elements 3, four further expandable elements 127 are provided which are normally contained in housings (not shown) located on the floor of the vehicle but which are expandable to the positions shown to enclose and protect the legs of the occupants of the vehicle.

In accordance with yet another feature of the invention the vehicle may be fitted exteriorly with expandable elements of any chosen number and position. By way of example the automobile shown in FIGS. 7 and 8 is provided exteriorly with two expandable elements 128 which are normally held inside appropriate housings generally flush with the exterior of the vehicle but which are expandable to the positions shown extending in front of the vehicle and around both front wings, to cushion impact when the vehicle is about to run into an obstruction.

The expandable elements 127 and 128 are actuable to assume the expanded positions shown in a manner identical to the elements 3 of the embodiments of FIGS. 1 and 2 or 3 and 4, so that further description is deemed unnecessary. Naturally the arrangement may be such that the electric circuits for actuating all the safety devices associated with a particular vehicle are all energized simultaneously, or individual safety devices, such as the devices 128, may be independently actuable either by the driver of the vehicle or by a different instrument or combination of instruments of the vehicle.

I claim:

1. A safety device comprising an expandable element, means housing said expandable element in a stored retracted position relative to an associated vehicle, means for filling said expandable element with a rapidly expandable prepressurized filler material, said housing means including an opening through which said expandable element is adapted to expand outwardly of said housing means, cover means closing said opening, latch means releasably securing said cover means to said housing means, and extensible and collapsible fluid operated means for releasing said latch means thereby resulting in the release of said cover means to allow said expandable element to expand outwardly through said opening under the influence of said prepressurized filler material.

2. A safety device as claimed in claim 1, wherein the latch means is annular and is located between a periphery of the cover means and a periphery of said opening.

3. A safety device as claimed in claim 1 in which said fluid operated means is deflated to release the latch means.

4. A safety device as claimed in claim 1 in which said fluid operated means is inflated to release the latch means.

5. A safety device as claimed in claim 1 in which said fluid operated means is electrically actuated.

6. A safety device as claimed in claim 1 in which said fluid operated means includes an explosive cartridge by which it is actuated.

7. A safety device as claimed in claim 6 wherein said fluid operated means includes a diaphragm which the cartridge is adapted to rupture when exploded thereby to release said latch means.

8. A safety device as claimed in claim 6 wherein means are provided for introducing a gas or low viscosity fluid into the fluid operated means under pressure by the action of a piston, and said fluid operated means includes a diaphragm actuated by the cartridge.

9. A safety device as claimed in claim 1 in which said fluid operated means is in the form of an expandable bladder.

10. A safety device as claimed in claim 1 in which the rapidly expandable filler material is combined with an aerosol propellant material.

11. A safety device as claimed in claim 10 in which the filler material is a fluid state foam.

12. A safety device as claimed in claim 10 in which the aerosol propellant material is taken from one of the following: $CHClF_2$ (Monochlorodifluoromethane), $CCl_2F_2$ (Dichlorodifluoromethane), $CCl_3F$ (Trichloromonofluoromethane), $C_2Cl_2F_4$, $C_2Cl_3F_3$, Butane/Propane, compressed Nitrogen/Propane, Nitrous Oxide, Carbon Dioxide.

13. A safety device as claimed in claim 12 in which a solvent is added to the readily expandable filler material to improve stability and compatibility between the constituents and to produce modified pressure characteristics.

14. A safety device as claimed in claim 1 in which the expandable filler material is stored in a pressurized state in a forcing chamber from which it is supplied directly to the housing means of the expandable element.

15. A safety device as claimed in claim 14 in which the forcing chamber is provided with a nonreturn valve through which the filler material is loaded.

16. A safety device as claimed in claim 14 in which the forcing chamber is divided into two portions by a movable wall, the filler material occupying the first portion to which the expandable element is connected and means being provided for pressurizing the second portion.

17. A safety device as claimed in claim 16 in which the movable wall is a diaphragm.

18. A safety device as claimed in claim 16 in which the second portion of the forcing chamber is pressurized by an aerosol propellant.

19. A safety device as claimed in claim 18 in which the material for prepressurizing the second portion of the forcing chamber is supplied by a cartridge which is discharged into the second portion during a loading operation.

20. A safety device as claimed in claim 1 in which the filler material passes through a grid of tapering holes prior to entering the expandable element.

21. A safety device as claimed in claim 14 in which a grid is provided between the forcing chamber and the housing means in which the expandable element is held prior to operation and an end of the expandable element is gripped between the housing means and the grid.

22. A safety device as claimed in claim 21 wherein the opposed surfaces of the grid and of the housing means between which the end of the expandable element is gripped are formed with mating corrugations adapted to improve the seal and retention of said element end therebetween.

23. A safety device as claimed in claim 14 in which means is provided for releasing the expandable element from a vehicle part on which it is mounted after a predetermined time interval following its expansion.

24. A safety device as claimed in claim 23 wherein the expandable element and the forcing chamber are an integral unit and in which means is provided for releasing the said unit from a fixed part of the vehicle after a predetermined time interval following expansion of the expandable element.

25. A safety device as claimed in claim 24 in which the said unit is released by the operation of a catch which is actuated by a release cartridge.

26. A safety device as claimed in claim 25 in which the release cartridge acts on a piston to move an operating member.

27. A safety device as claimed in claim 26 in which the said unit is connected to the said vehicle fixed part by a frame which is moved by the operating member to release the said unit.

28. A safety device as claimed in claim 27 in which the frame is provided with keyhole slots which engage headed retaining elements carried by said fixed part of the vehicle.

29. A safety device as claimed in claim 26 in which the piston is operated by a double acting cartridge, the first operation of which moves the piston in a first direction to operate a gas or fluid operated device to release the cover and the second operation of which occurs after a predetermined time interval following said first operation and moves the piston in a second direction to act on the operating member to actuate the release catch.

30. A safety device as claimed in claim 1 in which the expandable element is made up from a plurality of narrow elements which are joined together.

31. A safety device as claimed in claim 1 in which the expandable element is provided with a reinforced outer skin.

32. A safety device as claimed in claim 31 in which said outer skin comprises a mesh of metallic or plastics material.

33. A safety device as claimed in claim 32 in which said outer skin additionally comprises layers of plastics material film.

34. A safety device as claimed in claim 1 in which the expandable element is carried by a mounting and said mounting is connected to a forcing chamber in which the expandable filler material is provided.

35. A safety device as claimed in claim 34 in which the forcing chamber is annular.

36. A safety device as claimed in claim 34 in which the cover means extends in a transverse plane to the axis of the forcing chamber.

37. A safety device as claimed in claim 36 in which the housing means extends 360° around the forcing chamber and the depth of the housing means is varied to suit the distance to which the expandable element is to extend in any particular sector.

38. A safety device as claimed in claim 1 in which said fluid operated means is automatically responsive to rapid deceleration from braking or impact.

39. A safety device as claimed in claim 1 wherein the expandable element is divided along its length by porous internal walls opposed to outer walls of the element at one end thereof and wherein the body of the element between the inner and outer walls is of open cellular structure.

40. A safety device as claimed in claim 39, wherein the expandable element is elongated in its operative position with an open end thereof connected to the rim of a housing from which the element extends when the filler enters between the inner walls of the element, the inner and outer walls of the element being joined to close the end of the element remote from the housing in the operative position.

41. A safety device as claimed in claim 40, wherein the element is longitudinally divided by angularly spaced walls extending between each inner wall and the opposed outer wall and serving to subdivide the interior of the element and to reduce the loss of filler material in the event of localized damage of the walls of the element.

42. The safety device as defined in claim 1, wherein said filler material is a fluid state foam.